No. 706,073. Patented Aug. 5, 1902.
F. H. LIPPINCOTT.
MACHINE FOR CUTTING OR SHAVING ICE.
(Application filed Aug. 8, 1901.)
(No Model.) 2 Sheets—Sheet 2.
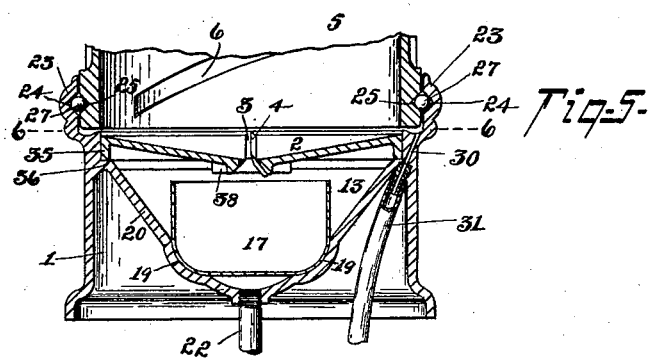
Fig-5-
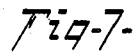
Fig-7-
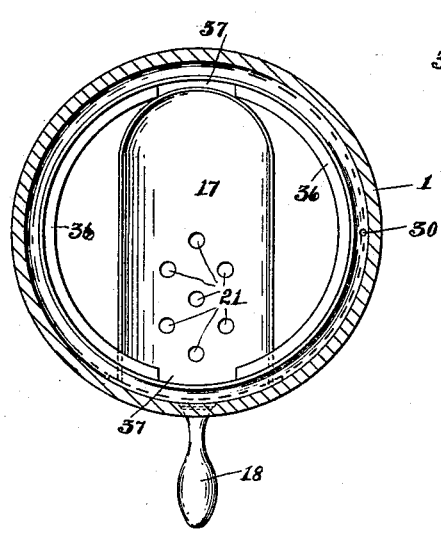
Fig-6-
WITNESSES:
Walter C. Pusey
A. V. Groups
INVENTOR:
Fisher H. Lippincott,
BY
Joshua Pusey,
ATTORNEY.

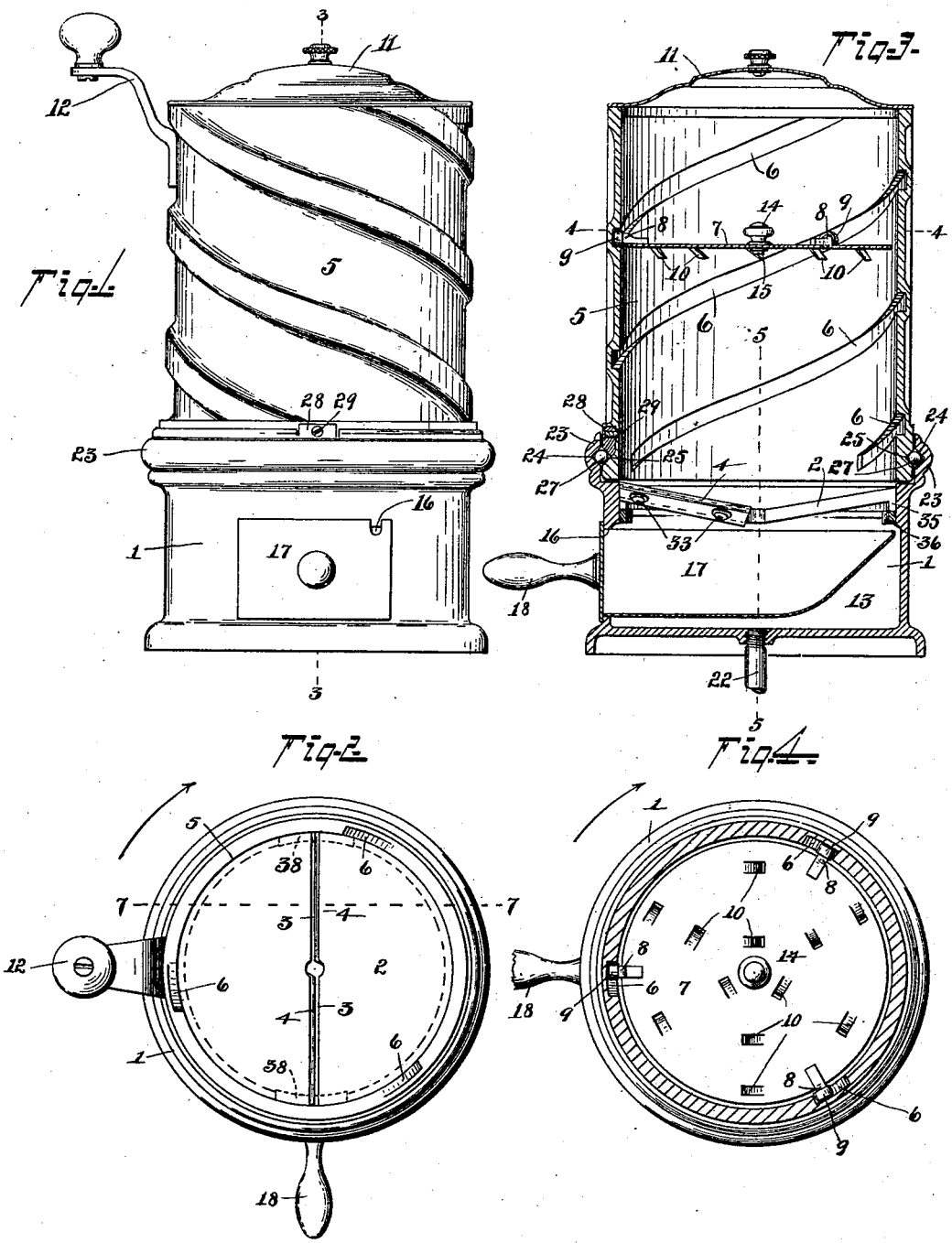

UNITED STATES PATENT OFFICE.

FISHER H. LIPPINCOTT, OF PHILADELPHIA, PENNSYLVANIA, ASSIGNOR TO AMERICAN SODA FOUNTAIN COMPANY, OF JERSEY CITY, NEW JERSEY, A CORPORATION OF NEW JERSEY.

MACHINE FOR CUTTING OR SHAVING ICE.

SPECIFICATION forming part of Letters Patent No. 706,073, dated August 5, 1902.

Application filed August 8, 1901. Serial No. 71,311. (No model.)

*To all whom it may concern:*

Be it known that I, FISHER H. LIPPINCOTT, a citizen of the United States, residing in the city and county of Philadelphia, in the State of Pennsylvania, have invented certain new and useful Improvements in Machines for Cutting or Shaving Ice, &c., of which the following is a full, clear, and exact description, reference being had to the accompanying drawings, of which—

Figure 1, Sheet 1, is a side elevation. Fig. 2 is a plan view, the cover and follower having been removed. Fig. 3 is a vertical section on line 3 3, Fig. 1. Fig. 4 is a section on line 4 4, Fig. 3. Fig. 5, Sheet 2, is a vertical section broken away on line 5 5, Fig. 3. Fig. 6 is a horizontal section on line 6 6, Fig. 5, the cutting-knives and their supporting-plate having been removed. Fig. 7 is an enlarged vertical section, as on line 7 7, Fig. 2, of the knife-carrying plate detached.

The object of this invention is to provide an improved machine for cutting or shaving ice and other substances, such as some vegetables and fruits, in which machine the lump or mass of ice or the like to be treated is automatically and continuously maintained in place to be operated upon by the cutting-blades.

The leading feature of the invention comprises a fixed base portion, suitable knives or cutters mounted therein, a rotatable bottomless cylindrical receptacle for ice or the like mounted upon said base above said knives or cutters and provided with screw-threads in its inner periphery, together with a horizontal disk or follower within the latter having peripheral projections corresponding with and adapted, respectively, to enter and be supported by said screw-threads, the under side of said disk being also provided with a series of points or projections, the construction being such, as hereinafter described, that when a body of ice or the like is placed in the said receptacle and the projections of the disk enter in the respective screw-threads and the disk resting upon the ice and the receptacle is rotated in the proper direction the said projections on the under side of the disk will, by the action of said screw-threads, be caused to engage the top of the ice, whereby the latter will be carried around with the receptacle and be continually fed or forced against the knives or cutters.

The invention also relates to certain combinations and details designed to simplify and perfect the construction and operation of the machine, all as hereinafter fully described.

Referring to the accompanying drawings, forming a part of this specification, in which similar numerals designate the same or corresponding parts, 1 is a hollow cylindrical base of the machine, in the upper part of which is supported a plate 2, preferably of dished form, as seen in Figs. 3 and 7, and having a slit 3 extending centrally across the same. Through this slit project knives 4 a suitable distance above the upper surface of the plate. One of these knives is to one side of the central portion of the plate and the other to the other side, and one projects obliquely forward in one direction, the other in the opposite direction, there being also a space between the edge of each knife and the opposite wall of the slit 3 to permit egress of the cuttings or shavings of ice or the like, all as clearly seen in the drawings.

Mounted in the base 1 of the machine above the knife-carrying plate 2 is a rotatable cylindrical receptacle 5, with means for retaining the same in place. On the inner periphery of this receptacle are three equidistant grooves 6, each in the form of a female screw-thread of sharp pitch and each in the present instance making one complete turn. The upper ends of these grooves are open, and their lower ends terminate at a point adjacent to the lower end of the receptacle.

7 is a disk, hereinafter termed the "follower," whose diameter is somewhat less than the internal diameter of said receptacle and is provided with three radially-projecting studs 8, which are the same distance apart as that of the grooves 6, and they carry each a small rotatable roller 9, whose diameter is less than that of the said grooves. The lower side of this follower is provided with a number of points or projections 10, which in the present instance are stamped out from the body of the disk, which is of sheet metal, and are inclined in the same circular direction and toward the direction in which the receptacle is to be rotated, as hereinafter explained.

I have now described the essential or important features or elements of my invention, but will defer the description of certain details of construction until after having described the mode of operation of the invention, which is as follows: The cover 11 of the receptacle and the follower 7 having been removed, a cake or lump of ice, for example, is placed within the receptacle 5, resting upon the top of the plate 2. The follower is held in the horizontal position, with the points 10 downward, and the rollers 9 are respectively entered into the open ends of the grooves 6. The follower is now released, and the rollers traveling in said grooves it (the follower) descends by its gravity, (or, if necessary, is pressed down by the hand,) at the same time rotating, because of the grooves 6 being screw-threads, until the points 10 rest upon the top of the ice. The receptacle is now rotated in the direction of the arrow in Figs. 2 and 4 by means of a conveniently-located handle 12, secured to the side of the receptacle.

It will be obvious that if the follower be prevented from turning with relation to the receptacle as the latter rotates the tendency will be for it (the follower) to descend by the action of the screw-thread grooves thereon. The points 10, tending to dig into the ice, prevent the follower from so rotating, and thus compel the ice to rotate with the follower and receptacle. The rotation of the ice causes the knives 4 to cut or shave off the same, the cuttings or shavings passing through the slits 3 into the chamber 13 of the base 1 beneath the plate 2. In like manner as the ice continues to be rotated and shaved off the follower is continually forced down as the receptacle is rotated, and thus it (the ice) is fed to the knives.

When it is desired to insert another piece or charge of ice within the receptacle, the cover 11 is first taken off and the follower 7 then removed.

In order to afford a convenient means for handling the latter, I provide the same with a central knob 14, loosely secured to the disk by a pin 15, that the follower may be free to rotate by the action of the threaded grooves while the knob is held by the hand when it (the follower) is being raised out of the receptacle.

The cuttings or shavings are removed from time to time through an opening 16 in the said chamber 13. Usually, however, I provide a scoop-shaped vessel 17, that is slid into the chamber in position to receive the cuttings or shavings, as shown. The end of the scoop 17 is adapted to close the opening 16 and has a handle 18 for the convenient insertion and withdrawal of the scoop. The lower rounded corners of the latter are adapted to slide in corresponding guideways 19 of convergent sides of a diaphragm 20 within the chamber 13, as seen in Fig. 5. The bottom of the scoop has a number of perforations 21, Fig. 6, to permit the escape of any water formed from the melting of the ice, which water is carried off through a pipe 22, leading from the bottom of said diaphragm and the chamber.

In order that the receptacle may turn easily, I provide a ball-bearing therefor, as follows: The circular flange 23 or part of the base 1 above the plane of the plate 2, to which the knives are attached, has on its inner periphery a continuous rectangular groove 24, and the adjacent outer periphery of the receptacle has a corresponding groove 25, the two constituting a raceway, which is filled with steel balls 27, all similar to some ball-bearings in common use. The balls are inserted in the raceway through an opening in the side of the receptacle, which is then closed by a suitable plate or block 28, that is held in place by a screw 29, as seen in Figs. 2 and 3.

Any excess of oil in the raceway is allowed to escape by way of an opening 30, communicating between the bottom of the raceway and a rubber pipe 31, as seen in Fig. 5.

The knives 4 are maintained at the required angle by means of suitably-inclined projections 32 of the under side of the plate 2, to which projections the knives are firmly secured by screws 33, which pass through elongated transverse slots 34 in the knives, whereby the extent of protrusion of the latter through the slots may be adjusted, as required. The said plate 2 is made removable from the receptacle, it having a peripheral flange 35, that rests upon an internal flange 36 of the base 1.

As a convenient means for preventing rotation of the plate when the machine is in operation, I provide the supporting-flange 36 with opposite depressions 37, into which corresponding projections 38 of the flange 35 of the plate 2 are adapted to enter.

I remark that in lieu of the grooves or female threads of the receptacle beads or male threads may be used, in which case the follower would be provided with suitable peripheral slots to receive the threads. I further remark that in lieu of the independent equidistant screw-threads of the receptacle a single screw-thread of suitable pitch may be employed, the follower being also provided with suitable projections adapted to engage the thread and at the same time maintain the follower in the horizontal position.

Having thus described my invention, I claim as new and desire to secure by Letters Patent—

1. In a machine for cutting or shaving ice, &c., the combination of the cutting-blades, the rotatable receptacle mounted above said blades, and having the screw-threads, together with the follower within said receptacle, having parts adapted to engage said threads, and having also the points or projections on its under side, all constructed and adapted to operate substantially as and for the purpose set forth.

2. In a machine for cutting or shaving ice, &c., the combination of the base, the non-rotatable plate, the cutting-blades secured thereto, the rotatable receptacle mounted on said base and having the screw-threads in its inner periphery, and the follower within said receptacle having parts or projections adapted to engage said threads, and having also the points or projections on its under side substantially as and for the purpose set forth.

3. In a machine for cutting or shaving ice, &c., the combination of the base, the fixed cutting-blades mounted therein, the rotatable receptacle above said blades, having the screw-thread grooves in its inner periphery, and the follower within said receptacle having the rollers adapted to enter said grooves and having also the points or projections on its under side, substantially as and for the purpose set forth.

4. In a machine for cutting or shaving ice, &c., the combination of the base, the removable non-rotatable plate, the blades secured thereto, the rotatable receptacle supported above said plate upon balls in a raceway between it said receptacle and a flange of said base, the screw-threads in said receptacle, and the follower within the latter having parts adapted to engage said threads and having also the points or projections on its under side, substantially as and for the purpose set forth.

In testimony whereof I have hereunto affixed my signature this 2d day of May, A. D. 1901.

FISHER H. LIPPINCOTT.

Witnesses:
ANDREW V. GROUPE,
WALTER C. PUSEY.